United States Patent [19]
Wydler et al.

[11] Patent Number: 5,480,198
[45] Date of Patent: Jan. 2, 1996

[54] DRIVE ARRANGEMENT FOR A SECURITY SYSTEM

[75] Inventors: Ulrich Wydler, Nürensdorf; Lothar Pfab, Zürich, both of Switzerland

[73] Assignee: Bauer Systemechnik AG, Rümlang, Switzerland

[21] Appl. No.: 102,463

[22] Filed: Aug. 5, 1993

[30] Foreign Application Priority Data

Aug. 13, 1992 [EP] European Pat. Off. ............. 92113819

[51] Int. Cl.$^6$ .................................................. E05C 1/06
[52] U.S. Cl. ................. 292/144; 292/142; 292/336.3; 74/89.14; 74/661.665 B; 70/275
[58] Field of Search ................................ 292/201, 257, 292/142, 144, 172, 336.3; 70/190, 191, 264, 275, 277, 278; 74/89, 89.14, 89.15, 661, 665 A, 665 B, 665 C

[56] References Cited

U.S. PATENT DOCUMENTS

| | | | |
|---|---|---|---|
| 2,706,912 | 4/1955 | Baker | 409/185 |
| 3,483,765 | 12/1969 | Fornataro | 74/89.14 |
| 3,767,240 | 10/1973 | Belanger | 292/144 |
| 3,933,382 | 1/1976 | Counts et al. | 292/144 |
| 3,947,060 | 3/1976 | Zimmer et al. | 292/144 X |
| 4,158,483 | 6/1979 | Fisher et al. | 74/89.14 X |
| 4,499,788 | 2/1985 | Obenland | 74/661 |
| 4,691,542 | 9/1987 | Young | 292/144 X |
| 4,732,218 | 3/1988 | Neumaier et al. | 74/665 A X |
| 4,962,676 | 10/1990 | Vainstock | 74/89.15 X |
| 4,986,099 | 1/1991 | Johnson et al. | 70/277 |
| 5,199,288 | 4/1993 | Merilainen et al. | 292/144 X |
| 5,249,831 | 10/1993 | Maniaci | 292/144 |

FOREIGN PATENT DOCUMENTS

| | | |
|---|---|---|
| 2396217 | 1/1979 | France . |
| 2398937 | 2/1979 | France . |
| 9011080 | 2/1991 | Germany . |
| 6501557 | 8/1966 | Netherlands . |
| 1596790 | 8/1981 | United Kingdom . |

Primary Examiner—Peter M. Cuomo
Assistant Examiner—Suzanne L. Dino
Attorney, Agent, or Firm—McAulay Fisher Nissen Goldberg & Kiel

[57] ABSTRACT

A drive arrangement for a security system has at least one actuating member which is supported so as to be movable out of an open position into a closing position, and vice versa, and serves to close and/or open locks, locking bolt mechanisms or catch mechanisms. Two reversible electric motors drive the actuating member by way of a geared connection which transforms rotational drive movements into translatory drive movements the geared connection is in the form of a differential gear unit having a driven member which is associated with the actuating member and having drive members which are associated with the electric motors. Each of the motors is in a geared connection with the drive members and forms an autonomously self-locking drive path which is supported by a bridge relative to forces emanating from the actuating member for moving the actuating member out of the open position into the closing position, and vice versa, individually or jointly or alternately.

11 Claims, 3 Drawing Sheets

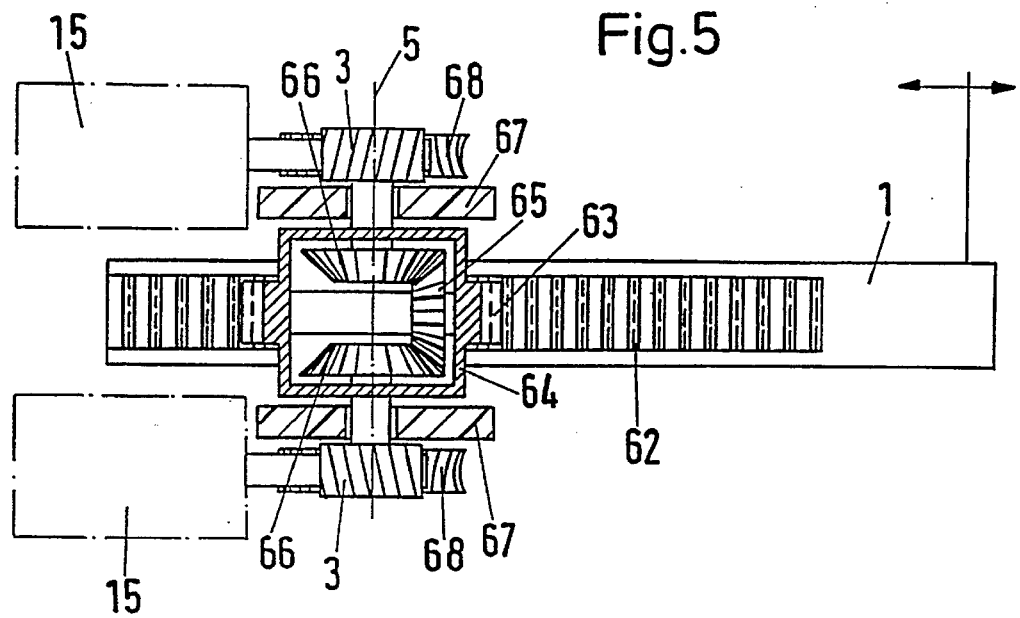
Fig. 5
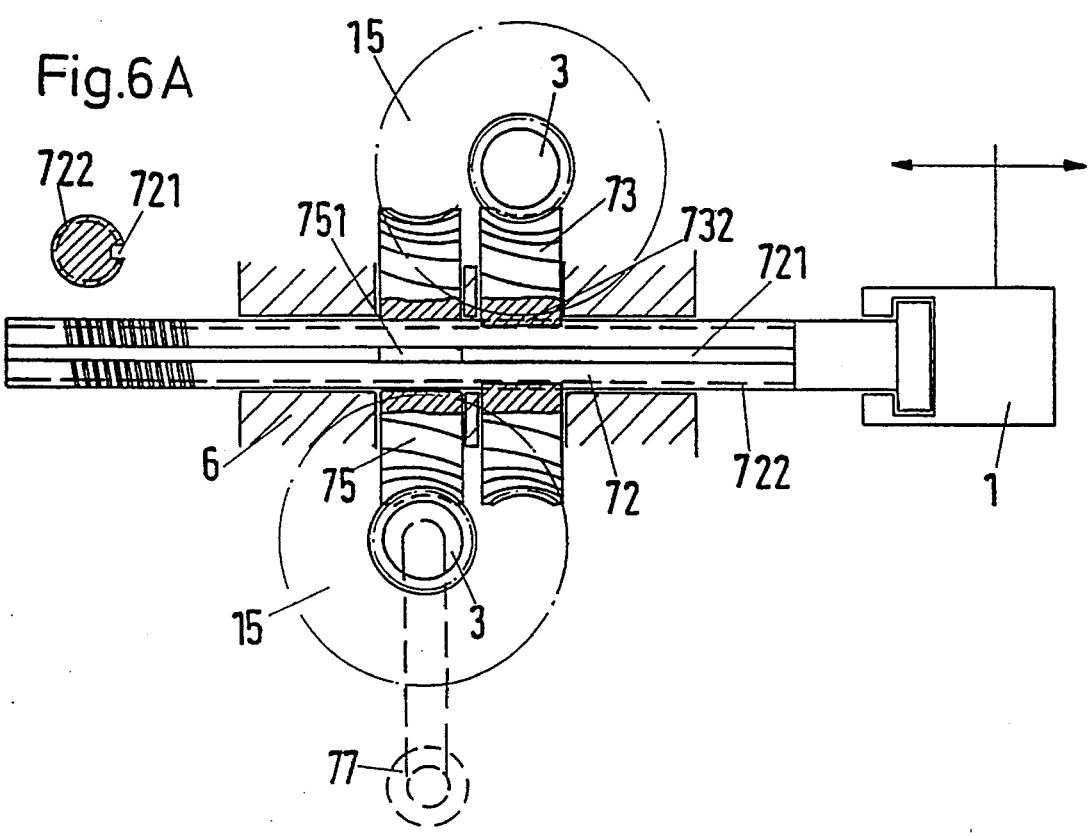
Fig. 6
Fig. 6A

DRIVE ARRANGEMENT FOR A SECURITY SYSTEM

BACKGROUND OF THE INVENTION a) Field of the Invention

The invention relates to a drive arrangement for a security system with at least one actuating member which is supported so as to be movable out of an open position into a closing position, and vice versa, and serves to close and/or open locks, locking bolt mechanisms or catch mechanisms and is driven by two reversible electric motors via a geared connection which transforms rotational drive movements into translatory drive movements.

b) Background of the Related Art

In the drive arrangement known from DE-G 90 11 080.3 (FIG. 3), The electric motors provided for the drive of the actuating member act on the actuating member against the action of a spring via a two-armed lever which is rotatably supported at the actuating member, the swiveling movements of the lever being defined by fixed stops associated with the two lever arms. The lever is alternately moved in one direction parallel to itself or in the other direction from is working position into its neutral position. For this purpose, the electric motors ac6ting on the ends of the levers via helical gear units must be switched on jointly to move the actuating member into the locking position, whereas only one motor need be switched on for unlocking.

Such a drive arrangement does not operate with sufficient reliability. For example, there may be a failure of the drive unit itself or the additional transmission devices to the actuating member which are actuated by the drive unit. The drive unit is then no longer fully functional. It can also come about that the power supply to the drive unit is interrupted or that the control or effective chain or signal path may be disrupted and the movement of the actuating member cannot be carried out for this reason so that it is not able to function properly with respect to time and path. Shocks can also disable the spring so that the actuating member is not held at its stops. In security technology, spring-loaded drive members are generally undesirable as structural component parts for locking elements. In addition, such actuating members used in lock technology, i.e. in door or lock bolts, are generally located on the inside of the door, i.e. in an inaccessible region for repairs in case of disturbance.

It is known in principle to provide a plurality of important drives for such actuating members and to trigger them by identical or different signals arriving by separate paths (redundant arrangement) so that, in the event of failure of an actuating path or of the intermediate members associated with it, the actuating member can be moved by the other drive options (see EP 0 111 186 B1).

This is relatively simple to accomplish insofar as the drive of the actuating members is effected manually or, e.g., by means of a plurality of electromagnets acting in parallel. However, if the actuating member must apply considerable forces and/or travel defined paths and therefore requires, e.g., electric motors or work cylinders as drive units, there arises the problem of independently coupling a plurality of such drive units, or possibly different drive units, to the actuating member, especially since the drive units must be in a constant working connection with the actuating member, e.g., when blocking one of two engaged electric motors in order to limit the movability of the actuating member.

It is also known in driven lock devices to allocate a lever connection to the lock bolt which, as an actuating member, is normally associated with an electric motor, so that the lock can be mechanically actuated manually in the event of disruption. Such constructions (emergency devices) are costly and require additional space (see DE-G 90 11 080, FIG. 1).

OBJECT AND SUMMARY OF THE INVENTION

A primary object of the present invention is to provide a solution by means of a redundant arrangement of the actuating drive for actuating members which are to be moved in translatory motion and which have a plurality of drive units which, if necessary, are triggered via separate signal paths and can be actuated individually and independently or jointly and simultaneously for the movement of the actuating member, e.g., from the neutral position into the locking position, and vice versa. In so doing, not only are the disadvantages of the known arrangements to be prevented, but beyond this, the possibility of a redundant drive is to be provided in a simple manner without the necessity of manual intervention.

This object is met according to a first embodiment example of the invention in that the geared connection is a differential gear unit whose driven member is associated with the actuating member and whose drive members are associated with the electric motors, each of which is in a geared connection with the drive members and forms an autonomously self-locking drive train or path which is supported relative to forces emanating from the actuating member and which can move the actuating member out of the open position into the closing position, and vice versa, individually or jointly or alternately.

It is known from FR-23 96 217 A1 to construct drives for the slide of a fluidic control valve so that they operate in a stepwise manner in such a way that two screws which are driven via an electric motor are in a working connection with a common helical gear which is supported in a linearly guided carriage for the drive of the actuating member.

Apart from the fact that this carriage is held in the initial position of the valve by means of springs, the actuating paths for opening and closing the flow cross sections of the fluid lines are predetermined in a stepwise manner to provide the desired fluid connections. Thus, there is no suggestion in this prior known construction of a step drive to utilize the concept as a redundant drive member for a security system.

According to another feature of the invention, the differential output drive associated with the two drives includes a helical gear which is supported on the actuating member so as to be rotatable around an axle fixed with respect to the actuating member and extending vertically relative to the direction of the translatory movement of the same and which helical gear maintains a constant engagement with the drive members associated with the electric motors, the drive members having the form of screws whose rotational axes are aligned parallel to the direction of the translatory movement of the actuating member.

In order to define or limit the extent of translatory movement of the actuating member, the driven member is rotatably supported, according to the invention, by means of an axle in a slot of the actuating member. A stop body which has different stop surfaces and cooperates with a fixed stop at the housing of the lock mechanism is connected with the axle and can be displaced and fixed in the open position of the actuating member via an opening in the housing of the lock mechanism so as to be accessible from the outside.

According to another feature of the invention, a toothed rack in a geared connection with a housing gear of a differential gear unit associated coaxially with the axle is associated with the actuating member. The ring gears of the differential are in a geared connection with one another via a differential gear which is rotatably supported in the housing of the differential gear unit, and the shafts carrying the ring gears are supported coaxially to the axle so as to be rotatable in the housing on one side and rotatable in bearing blocks fixed in the lock case on the other side and, on the drive side, carry helical gears which engage with the screws driven by the electric motors.

Finally, the construction of the drive arrangement can also be effected in such a way that a threaded spindle is associated with the actuating member coaxially and is connected with the actuating member so as to engage axially in a positive-locking manner and so as to be radially rotatable. The threaded spindle has at least one axial groove and a screw thread which is in a working connection with a helical gear via a centric screw thread of this helical gear. The helical gear is held at its side by the clamping mechanism housing so as to be axially fixed, and one or more grooves of the threaded spindle are in a radially positive-locking working connection with the helical gear via one or more drivers arranged in a smooth centric bearing bore hole of an additional helical gear: the helical gear is thus held at its side by the clamping mechanism housing so as to be axially fixed and both helical gears are in a geared connection respectively with the screws driven by the electric motors.

As a result of the inventive arrangement of two drive units which maintain a constant working connection with the adjusting member and can be controlled simultaneously or alternately via separate signal paths, two drive movements having no reciprocal influence are transmitted to the same actuating member in a surprisingly simple and reliable manner. It is ensured that no drive movements of the drive arrangement transmitted via the actuating member are possible. Thus, the drive units are self locking. Also, for example, one drive path can be used for closing the security system and the other drive path can be used for opening the security system. On the other hand, if one drive path alone is used for closing and opening, the second drive path can be used as a redundant drive path.

Regardless of its embodiment form, the drive arrangements can be constructed so as to occupy little space so that they can be installed in the location of already existing drive arrangements and accordingly bring about an increased actuating and operating reliability.

The invention is described in the following with reference to four embodiment examples of a drive arrangement for a locking system which are shown more or less schematically in the drawings.

BRIEF DESCRIPTION OF THE DRAWINGS

FIG. 5 shows a top view of a third embodiment example of the invention with a differential gear unit; and FIG. 6 shows a top view of a fourth embodiment form of a drive arrangement according to the invention.

DESCRIPTION OF THE PREFERRED EMBODIMENTS

Figure 1:
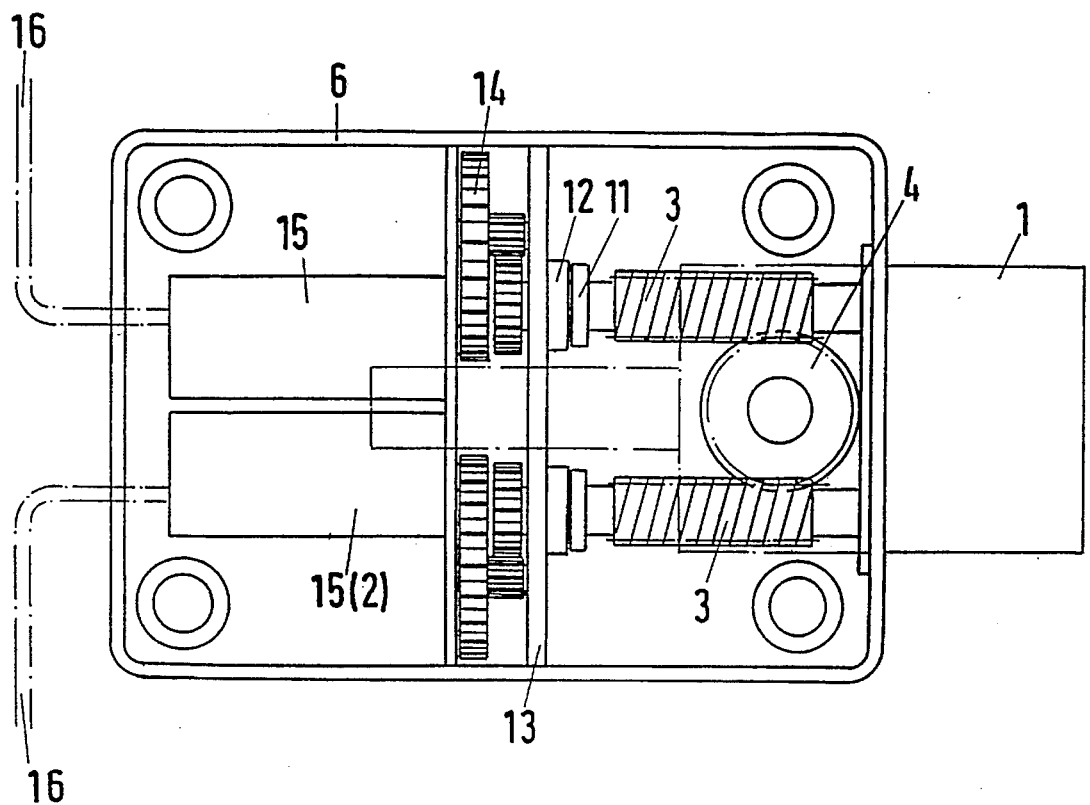
FIG. 1 shows a top view of a first embodiment form of a box bolt-lock for security systems with a drive arrangement according to the invention.
Figure 2:
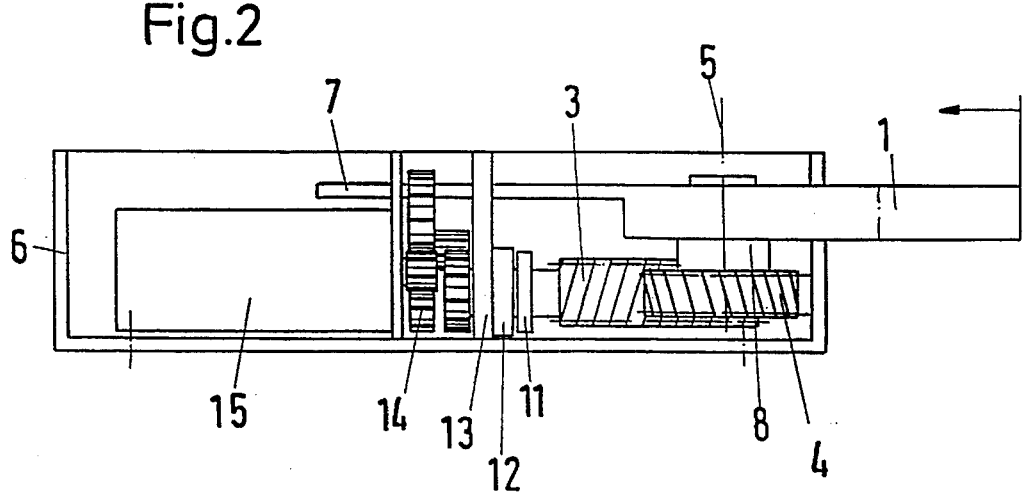
FIG. 2 shows the box bolt-lock according to FIG. 1 in cross section

FIGS. 1 and 2 show a so-called box lock—shown without cover—with a locking bolt which is in the locking position and is movable via a drive such as is used in many safes or vault doors. A rod linkage, not shown, for actuating one or more locking members is also often articulated at the locking bolt, hereinafter actuating member.

In order to open, i.e. unlock, the box lock shown in the drawing, the actuating member 1 must be moved back into the lock case 6 of the box lock by means of the drive 2, whereas the actuating member must be moved forward or outward again into the position shown in FIG. 1 in order to close or lock. The actuating member 1 is guided at the front in the housing wall and in the rear region of the lock case by its projection or elongation 7 indicated in FIG. 2. A bearing receptacle 8 for a helical gear, e.g. a helical-toothed spur gear, functioning as a differential member and designated generally by 4, is securely connected with the actuating member 1 in a working connection along an axle 5 vertically penetrating the lock case, the bearing receptacle 8 being fixed at one end. The helical gear 9 acting as differential member engages on two opposite sides respectively with one of the cylindrical screws acting as transmission members 3. In order to ensure a high degree of efficiency of the worm or screw drive, the latter is designed so as to be self-locking only to a limited extent, especially since this is only required in locks for unauthorized opening, i.e. moving back the bolt.

In order to prevent a forcible sliding back of the lock bolt, e.g., in a burglary attempt, brake disks 12 are associated with the screws 3 and are arranged on a bridge 13 located in the housing case. At the occurrence of very high bolt forces, the two screws are axially displaced by a slight distance in a resilient manner so that their collars 11 engage with the brake disk 12 acting on one side.

Of course, the self-locking can also be achieved solely by means of a corresponding pitch angle of the provided screw drive.

It is important that all forces acting on the lock bolt in the actuating direction or transmitted by the latter are received via the two screws in their bearing and supported by the bridge 13 located in the lock case.

A spur-gear unit 14 making up a part of each drive 2 is provided behind the bridge 13 for each of the two transmission members. A reversible d.c. motor 15 arranged in the rear portion of the lock case for each of the two drive units is in a geared connection with the screws 3 via the spur-gear unit 14. Each d.c. motor is controlled via a separate signal line 16.

The above-described embodiment example thus has two drive units, each of which is associated with transmission members in the form of screws which transform rotating drive movements into a translatory movement directed in the direction of the translatory movement of the actuating member and maintain a constant engagement with the common toothed wheel acting as a differential drive. The toothed wheel is supported on the actuating member so as to be rotatable in an unlimited manner around an axis which is fixed with respect to the actuating member and extends vertically to the direction of the translatory motion of the actuating member and, during each movement of one of the two transmission members, transforms the translatory movement of the transmission members which is directed parallel to one or the other direction of the translatory movement of the actuating member into a movement of the actuating member corresponding to half the sum of these movements.

The box lock shown in the embodiment example is a component part of a lock system which is redundant in its entirety. A circuit, not shown in the drawing, ensures that the two drive paths operate in a uniformly alternating manner, but under certain conditions can also be operated simultaneously. The monitoring devices arranged in the lock as a component of the locking system and which monitor the operation of each of the two drive paths are also not shown in the drawing.

In the event of a defect in one of the two drive paths, including the data transmitting or data evaluating units which are connected upstream of the latter and are likewise redundant, or in the respective power or signal transmission, the parallel system part with its drive path takes over the entire operation of the lock system by itself. An error message is given simultaneously in a manner known per se so that repairs can be performed.

Figure 3:
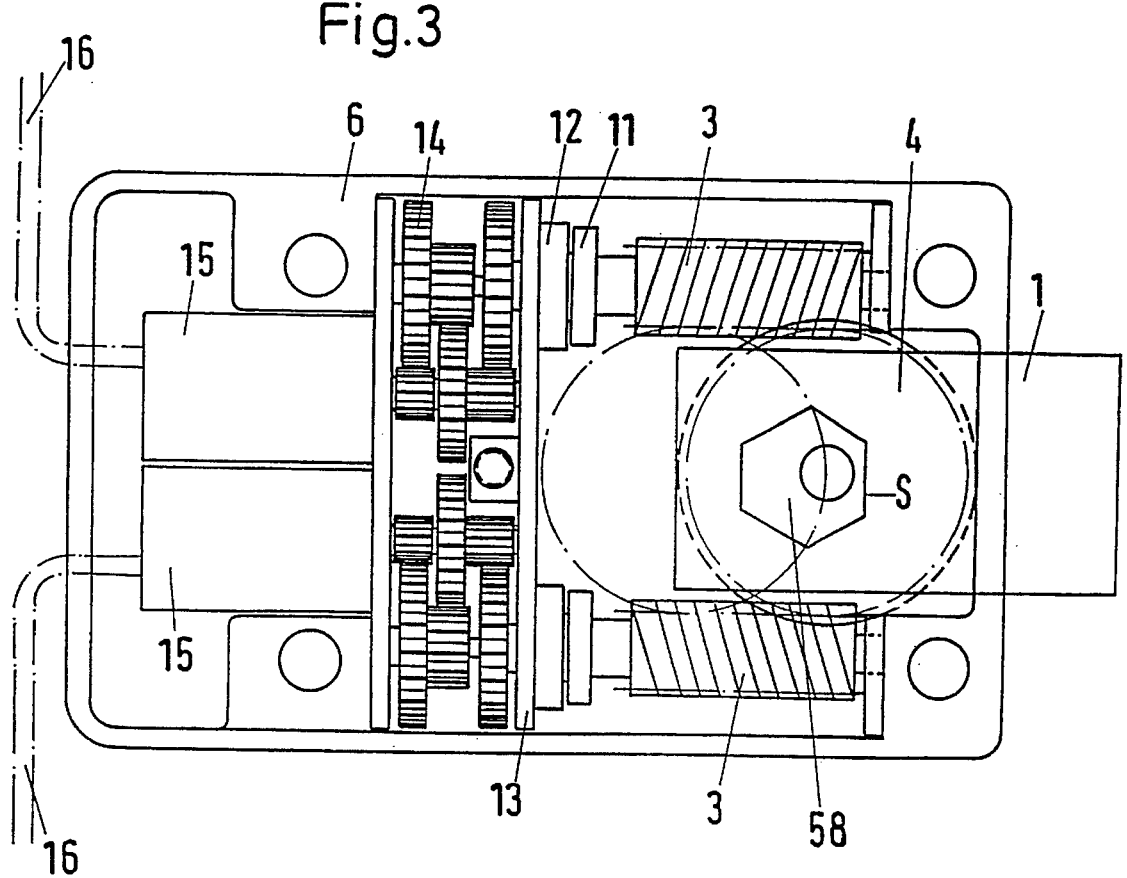
FIG. 3 shows a top view of a second embodiment example of the drive arrangement according to the invention with a stop defining the actuating path.
Figure 4:
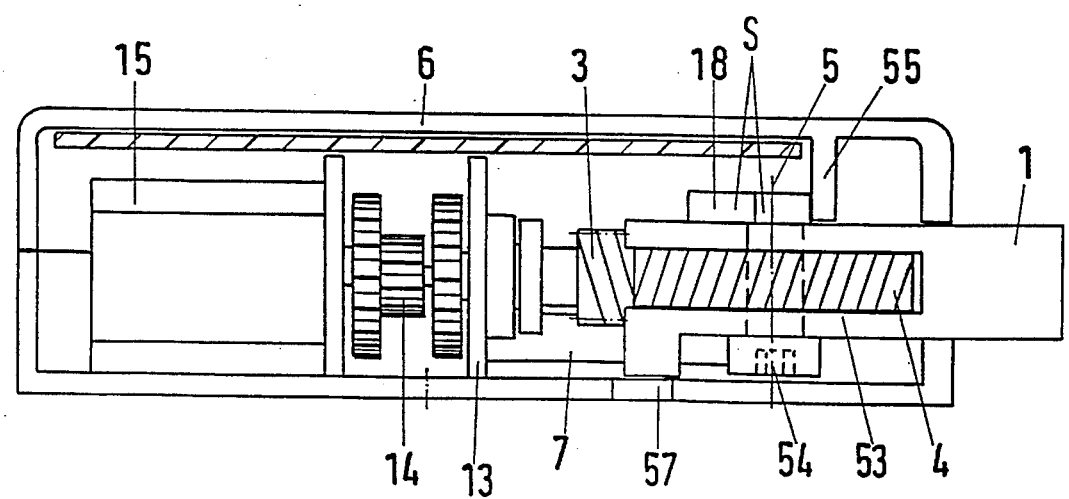
FIG. 4 shows an embodiment example according to FIG. 3 in cross section.

FIGS. 3 and 4 show an advantageous further development of the described drive arrangement in which the translatory movement of the actuating member 1 is defined by a stop 58. For this purpose, an externally accessible opening 57 is arranged in the lock case 6 in such a way that the axle 5 of the differential member 4 is located in the region of the opening 57 when the actuating member 1 is moved back into the unlocking position. The differential member 4 is supported via the axle 5 in a slot 53 which penetrates the actuating member 1 parallel to the lock case 6. The axle 5 is hollow and receives within it a clamping screw 54 which contacts a collar of the axle 5 with its screw head and engages at the threaded side in a stop body 58 which is held in a frictional engagement against a surface of the actuating member 1. The stop 58 is constructed as a disk having wrench surfaces S, the thread for the clamping screw 54 being arranged coaxially at or in the disk so as to be eccentric to the axle 5.

The housing of the lock case 6 has an inwardly directed stop 55 against which the stop 58 strikes at the end of the locking process, i.e. when the actuating member 1 moves out into the closing position, and accordingly defines the translatory movement of the actuating member 1.

The adjustment of the translatory movement of the actuating member 1 is effected in the open position of the actuating member 1 after loosening the clamping screw 54 by corresponding allocation of the respective wrench surface S of the stop 58 associated with the locking path traveled by the actuating member, whereupon the clamping screw 54 is fixed again.

Accordingly, variable bolt paths can be adjusted by degrees, as needed, in a simple manner. Further, the arrangement of the differential member 4 in the opening of the actuating member 1, according to the invention, allows for a very flat construction of the drive arrangement. A further advantage consists in that only one type of lock need be manufactured for realizing different bolt paths.

FIG. 5 shows another embodiment form of the drive arrangement according to the invention.

The actuating member 1 which is guided in guide elements, not shown, has a toothed rack 62 connected with it which engages in a rolling connection with a portion of the housing 64 of a modified drive path constructed as a spur gear 63. The ring gears 66 which are rotatably arranged in the differential housing 64 are in a geared connection with one another via a differential gear supported in the differential housing 64. The ring gears 66 are rotatably supported in the differential housing 64 on the one hand and in the stationary bearing blocks 67 on the other hand by means of shafts which are connected with the ring gears 66 and arranged coaxially to the axle 5. The shafts carry helical gears 68 respectively at their ends remote of the ring gears 66. The helical gears 68 are driven with the screw shafts 3 via the drive motors 15, indicated in the drawing, corresponding to the embodiment example according to FIG. 1.

For purposes of balance, a right-handed helical gear unit can be used on one side and a left-handed helical gear unit on the other side, taking into account a reversal of the rotating direction of the drive motors 15.

The above-described construction according to the invention is suitable in particular for lock mechanisms in which the longest possible translatory movements of the displacing member 1 are desired.

This embodiment form is also advantageous in that, when operating the drive arrangement, also in the event of a failure of one of the two drive paths, the lock mechanism can be brought into the closing position as well as into the open position in a reliable manner by the remaining drive path.

The embodiment example of the invention according to FIG. 6 shows a threaded spindle 72 which is arranged coaxially to an actuating member 1 and is supported in the actuating member 1 so as to engage in a positive-locking manner axially and so as to be radially rotatable and is guided in the lock case 6 so as to be axially displaceable as well as radially rotatable. The threaded spindle 72 has a screw thread 722 approximately along its entire length and an axial groove 721 approximately along the entire length. A first screw 3, which is axially guide in the stationary housing of the lock case 6 and which is provided with a screw thread 732 in the center, engages with the screw thread 722 of the threaded spindle 72. The threaded spindle 72 and the first screw 3 form a helical gear unit for transforming the rotational movement of the helical gear into a reciprocating (translatory) movement of the threaded spindle. The helical gear 73 is driven by the first screw 3 which is in a working connection with the drive motor 15 indicated in the drawing.

An additional helical gear 75 which is guided at its side through the housing so as to be axially fixed engages in the groove 721 of the threaded spindle 72 via a driver 751 which is arranged in its smoothly constructed central bore hole and is constructed as a pass spring so that the helical gear 75 is held radially. However, the threaded spindle 72 is freely displaceable axially in the smooth bore hole. The helical gear 75 is driven via a second screw 3 which is in a working connection with a drive motor 15 indicated in the drawing.

It is also true in this instance that, in the event of a failure of the drive motor 15 associated with the helical gear 75, the threaded spindle 72 is moved in translatory movement, either by the helical gear acting as nut or by means of the thread 732 of the helical gear 73 engaging with the thread 722 of the threaded spindle 72 and so that the actuating member 1 can be moved into an open or closed position. The threaded spindle 72 slides through the smooth bore hole of the helical gear 75, wherein the driver 751 which is arranged in the helical gear 75 and slides in the groove 721 so as to be transversely displaceable serves radially as an abutment. On the other hand, if the helical gear 73 is stationary due to failure of the drive motor associated with it and the helical gear 75 is driven, the driver 751 of the helical gear 75 transmits the rotational movement to the groove 721 and accordingly screws the threaded spindle 72 through the thread 732 of the helical gear 73 serving as an axial abutment into the open or closed position of the actuating member 1. In this manner, a reliable opening and closing of the actuating member 1 is ensured in the event of failure of one of the electric motors 15 or of the drive paths associated with them.

A hand crank 77 can be associated with the screws 3 as a mechanical auxiliary device for manual actuation of the actuating member 1.

While the foregoing description and drawings represent the preferred embodiments of the present invention, it will be obvious to those skilled in the art that various changes and modifications may be made therein without departing from the true spirit and scope of the present invention.

What is claimed is:

1. A locking mechanism for a security system comprising:
    a lock case;
    a lock bolt moveable along a translational axis between a locking position and an unlocking position, said locking position being occupied when a portion of said lock bolt extends out of said lock case;
    transmission means for transforming rotational motion into translational motion, said transmission means coupled to said lock bolt; and
    first and second motors rotatably engaging said transmission means, said first and second motors each having first and second directions of rotation,
wherein said transmission means converts rotational motion of said first and second motors into translational motion of said lock bolt, said first directions of rotation urging said lock bolt into said locking position and said second directions of rotation urging said lock bolt into said unlocking position.

2. The locking mechanism of claim 1 wherein said transmission means comprises:
    a helical gear which is supported on and rotatable with respect to said lock bolt, said helical gear having a first axis of rotation, said first axis of rotation being substantially perpendicular to said translational axis of said lock bolt;
    first and second drive members having second and third axes of rotation, respectively, said second and third axes of rotation being positioned parallel to said translational axis so as to maintain constant engagement between said helical gear and each of said first and second drive members, said first and second drive members being rotatable by said first and second motors, respectively.

3. The locking mechanism according to claim 2 further comprising:
    a stop body mountable on said lock bolt;
    said lock case receiving said actuating member, said transmission means, said stop body and said first and second motors, said lock case including an opening through which said lock bolt is movable; and,
    a fixed stop positioned by said lock case to encounter said stop body when said lock bolt occupies said unlocking position.

4. The locking mechanism of claim 2 further comprising first and second spur gear units coupled between said first and second motors and said first and second drive members, respectively.

5. The locking mechanism of claim 2 further comprising first and second brake elements, said first and second brake elements positioned between said first and second motors and said first and second drive elements, respectively, said first and second brake elements preventing movement of said lock bolt during axial loading or rotation of the drive members in a preselected direction.

6. The locking mechanism according to claim 1 further comprising:
    a stop body mountable on said lock bolt;
    said lock case receiving said lock bolt, said transmission means, said stop body and said first and second motors, said lock case including an opening through which said lock bolt is moveable; and,
    a fixed stop positioned by said lock case to encounter said stop body when said lock bolt occupies said unlocking position.

7. The locking mechanism of claim 1 wherein:
    said transmission means comprises:
    a housing gear having a wall defining a chamber, a spur gear positioned external to the chamber on said wall, a pinion gear rotatably mounted to said wall within the chamber, a first axis of rotation, said first axis of rotation being perpendicular to said translational axis, and first and second openings in said wall, the first opening in said wall positioned on said first axis of rotation and across the chamber from the second opening in said wall, the second opening being positioned on said first axis of rotation;
    first and second gear mechanisms each comprising: a ring gear rotatably positioned along said first axis of rotation and engaging said pinion gear, a shaft connected to said ring gear, and a helical gear positioned external to the chamber, wherein the shaft of said first gear mechanism extends through the first opening and the shaft of the second gear mechanism extends through the second opening; and,
    first and second drive members having second and third axes of rotation, respectively, said second and third axes of rotation being positioned parallel to said translational axis so as to maintain constant engagement between said helical gear and each of said first and second drive members, said first and second drive members being rotatable by said first and second motors, respectively, and,
    said lock bolt comprises a toothed rack in a geared connection with said housing gear.

8. The locking mechanism of claim 1 wherein said transmission means comprises:
    a threaded spindle rotatably positioned along said translational axis;
    first and second helical gears each having a threaded central opening engaging said threaded spindle;
    means to permit translational movement but not rotational movement of said threaded spindle relative to said first and second helical gears; and first and second drive members having first and second rotational axes, respectively, said first and second rotational axes being positioned parallel to said translational axis so as to maintain constant engagement between said first and second helical gears and said first and second drive members, respectively, said first and second drive members being rotatable by said first and second motors, respectively, and wherein said lock bolt rotatably receives said threaded spindle.

9. The locking mechanism of claim 1 further comprising:

a first monitoring device for monitoring performance of said first motor, said transmission means, and said lock bolt; and a second monitoring device for monitoring performance of said second motor, said motion conversion means, and said lock bolt.

10. The locking mechanism of claim 1 further comprising a first monitoring device for monitoring performance of said first motor, said transmission means, and said lock bolt.

11. The locking mechanism of claim 1 further comprising a second monitoring device for monitoring performance of said second motor, said motion conversion means, and said lock bolt.

* * * * *